US005475603A

United States Patent [19]

Korowotny

[11] Patent Number: 5,475,603

[45] Date of Patent: Dec. 12, 1995

[54] APPARATUS AND METHOD FOR MAIL QUALIFICATION AND TRAYING

[75] Inventor: Scott Korowotny, Oxford, Conn.

[73] Assignee: Pitney Bowes Inc., Stamford, Conn.

[21] Appl. No.: 264,127

[22] Filed: Jun. 21, 1994

[51] Int. Cl.[6] .......... G06F 17/00

[52] U.S. Cl. .......... 364/478; 364/464.03; 209/584; 209/900

[58] Field of Search .......... 364/478, 464.01–464.03; 235/375, 376, 495, 462, 384, 378; 209/554, 900, 3.3, 546

[56] References Cited

U.S. PATENT DOCUMENTS

| | | | |
|---|---|---|---|
| 5,104,681 | 4/1992 | Sansone | 427/8 |
| 5,119,306 | 6/1992 | Metelits et al. . | |
| 5,142,482 | 8/1992 | Sansone . | |
| 5,216,620 | 6/1993 | Sansone | 364/478 |
| 5,245,545 | 9/1993 | Taylor | 364/478 |
| 5,264,665 | 11/1993 | Delfer, III | 364/464.03 |
| 5,270,938 | 12/1993 | Sansone et al. | 364/464.02 |
| 5,287,976 | 2/1994 | Mayer et al. | 209/547 |
| 5,329,102 | 7/1994 | Sansone | 235/375 |

*Primary Examiner*—James P. Trammell
*Attorney, Agent, or Firm*—Ronald Reichman; Melvin J. Scolnick

[57] ABSTRACT

Apparatus and method for providing dual sliding windows for the purpose of determining postage discount qualifications across invalid and unreadable mail pieces and determining the number of mail pieces to be placed in a mail tray for receiving the maximum postage discount. This is accomplished by storing the criteria for postal discounts in a controller and determining the number of mail pieces that can be received in a tray based upon the thickness of the mail pieces. The system includes a scale that weighs the mail pieces, from which weight the thicknesses of the mail pieces can be determined on an individual basis, and an OCR reader that reads the zip codes in the address block of the mail pieces to assure they are valid and readable, and a controller for performing the necessary computations.

10 Claims, 4 Drawing Sheets

APPARATUS AND METHOD FOR MAIL QUALIFICATION AND TRAYING

RELATED APPLICATION

U.S. patent application Ser. No. 07/594,515, entitled Method And Apparatus For Preparing Validated Mail Tray Labels, filed Oct. 9, 1990 U.S. Pat. No. 5,329,102.

BACKGROUND OF THE INVENTION

Mailers who send out large volumes of mail are increasingly seeking ways of processing mail that would allow the mailer to receive a maximum postage discount from the postal service, obtain optimum postal routing and achieve reporting and tracking capability for their mail and receive a postal discount. Mailing systems are available that are capable of outputting high volumes of mail. These systems normally include an inserter for generating the mail piece, a scale for weighing each mail piece, and a computer that communicates with the scale for the purpose of determining postage.

Many schemes have been suggested in the past whereby mailers would be able to process their mail in a manner so as to obtain the postal discounts available from the postal service and reduce the amount of effort required by the postal service in processing the mail. These schemes have advanced the state of the art relative to achieving advantages for both the mailer and the postal service, but few schemes have directly correlated the zip code breaks and the amount of mail that is to be placed in a mail tray. By zip code breaks is meant the change in zip code from one portion of mail to another, whether it be a nine digit, five digit zip code or the first three digits of a zip code. Contemporary mail processors normally operate in a manner so that mail pieces going to the same zip code destination are processed sequentially. The zip code not only serves as a boundary of one mail portion to the next, but also allows a postal discount.

One qualification for obtaining a postage discount is related to the number of mail pieces addressed with the same zip code classification, assuming that such mail pieces are processed sequentially. Such zip code classification can either be zip code +4, five digit zip code or three digit zip code. The amount of postage discount available varies with the level of zip code classification, the greatest discount being for zip+4, then for five digit zip, and the least discount for the three digit classification. In order to achieve these postage discounts and increase the speed at which the mail is delivered, the mail trays must be arranged so that they contain appropriate quantities of mail for the various zip code designations, the quantities varying for each postage discount qualification. In addition, the trays must be sufficiently full to meet the postal service requirements.

One problem that arises in determining whether a mailer has achieved an appropriate number of mail pieces to obtain a zip code is that of invalid and non-readable mail pieces. An invalid mail piece is one in a mail stream which cannot be used in determining mail qualification. This can be caused by an incomplete or missing zip code, an incorrect address, a faulty weight, or a false reading of the zip code or address. A non-readable mail piece is one with an address or zip code that cannot be machine read. With prior systems, if such an event occurred, the mail piece count would start over upon the detection of an invalid or non-readable mail piece and the postal discount would drop to the next lower level even though that invalid or non-readable mail piece were the only one responsible for losing the higher discount.

Clearly, it would be advantageous to be able to maintain mail qualification despite the presence of invalid or non-readable mail pieces and correlate the processing of mail with the traying of the same based upon mail qualifications and the filing of mail pieces into mail trays.

SUMMARY OF THE INVENTION

Mail pieces that have been generated by a mail processing system are conveyed to a scale and passed under an optical character reader (OCR) before being deposited in a power stacker where the mail pieces are assembled. The weight, zip code and status byte of each mail piece is sent to a controller. Upon the start of the receipt of mail piece data, the controller opens two windows, a mail window and a tray window. The mail window determines the quantities of mail required for a postal discount and whether the data received relative to a mail piece represents a valid or invalid reading. If the data is valid, the mail piece is included with prior mail pieces of the same classification for minimum number of mail pieces for postal discount purpose if the data is invalid, the mail window discards the data and compares the data from the next mail piece. If the next subsequent mail piece data represents a valid mail piece, the mail window does a zip code check to see if the zip code break has occurred, and if not, continues to count the number of mail pieces after outstacking the invalid mail piece. When a zip code break is encountered, all existing pieces in the mail window are qualified according to the postal regulations and the mail window now starts over with the first new zip code. This continues until the last mail piece has been processed. At this time the mail in the window is qualified and the window is then closed. The tray window is also opened with the processing of the mail piece and only adds mail pieces that the mail window determines to be valid. The tray window also uses the weight of each mail piece to calculate its thickness. The tray window establishes a tray alert and a tray break. A tray alert is a flag to indicate that the capacity of a tray is new. A tray break indicates that the number of mail pieces for filling a tray has been reached, the thickness of the mail pieces and mail qualification window being taken into account. The controller coordinates the data of the mail window and the tray window so as to fill the trays in a manner to obtain the maximum discount.

BRIEF DESCRIPTION OF THE DRAWING

In the following figures, like numbers are used to identify like parts.

DETAILED DESCRIPTION OF THE PREFERRED EMBODIMENT

Figure 1:
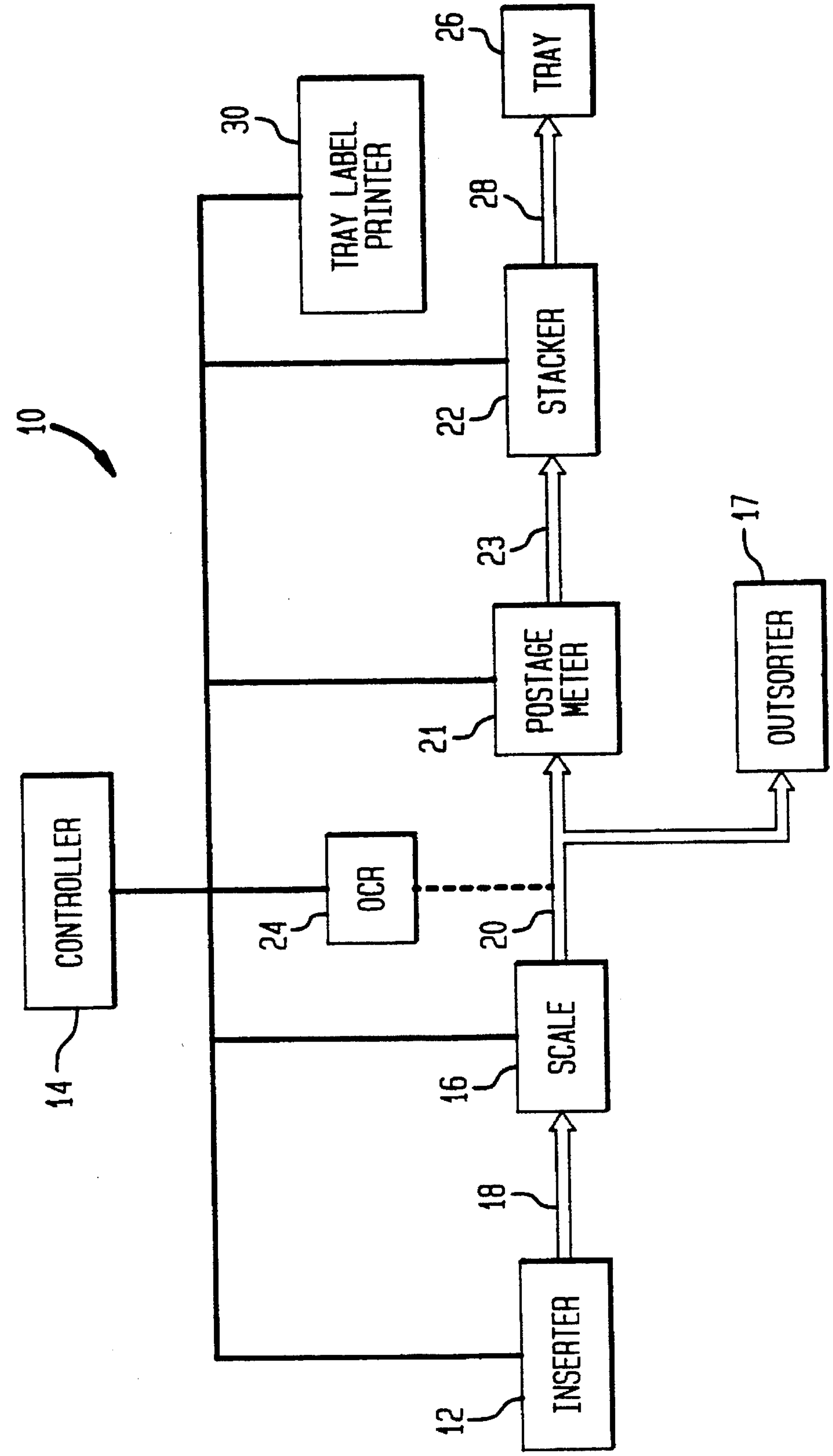
FIG. 1 is a block diagram representation of a system that can be used for practicing the instant invention.

With reference to FIG. 1, a mail processing system is shown at 10 in which the instant invention can be practiced. In FIG. 1, electrical connections are indicated by a single solid line, conveyance of mail pieces by double line, and an optical path by a dotted line. The system includes an inserter 12, such as a Model 8300 series inserter available from Pitney Bowes Inc., that is in communication with a controller 14. The controller 14 can be any of a number of computers such as an IBM PS/2 available from IBM Corporation and has stored therein postal regulations relative to mail piece and postal document equipment. Downstream from the inserter 12 is a scale 16, there being conveying mechanisms 18 for conveying the mail pieces in seriatim from the inserter to the scale 16. An example of a scale that can be used in this invention is described in U.S. Pat. No. 4,778,018. Conveying mechanisms that can be used to transport mail pieces are well known such as the conveying mechanism shown in U.S. Pat. No. 4,935,078. Another conveying mechanism 20, which is similar to the conveying mechanism 18, conveys mail pieces serially to a postage meter 21. In instances where franking is not required, as for example in a manifest system, a postage meter 21 may be included. Downstream from the postage meter 21 is a mail piece stacker 22. Located intermediate the scale 16 and the postage meter 21 is an optical character reader (OCR) unit 24 that is capable of reading printed matter on each mail piece that is passed under the same. Although an OCR unit 24 is shown, it will be appreciated that a bar code reader can be used instead when the mail pieces have printed thereon bar codes representing the zip codes. An example of such a bar code is the delivery point bar code. Downstream from the location on the conveying path 20 where the mail prices are scanned by the OCR unit 24 is an outsort device 17 outsorts invalid mail pieces.

The scale 16, postage meter 21, stacker 22 and OCR unit 24 all communicate with the controller 14 for purposes that will be described hereinafter. Downstream from the stacker 22 is a traying unit 26 that receives mail pieces transferred by a conveying mechanism 28 from the stacker. Adjacent to the traying unit 26 and in communication with the controller 14 is a tray label printer 30.

In operation, the mail processor generates mail pieces by inserting an appropriate number of inserts into an envelope and sealing the same. If the envelopes are windowed envelopes, the addresses will show through the envelope windows, but if the envelopes are closed, then a printer is required to print the address on the envelope as is well known in the art. The conveying mechanism 18 conveys the mail pieces serially to the scale 16 where the mail pieces are weighed. The weight of each mail piece is transmitted to the controller 14 for two purposes. The controller 14 will have a postage chart rate from which the postage due for each mail piece can be calculated. In addition, the thickness of each mail piece is determined by the weight of the mail piece. Knowing the weight and thickness of each insert, one is able to calculate, rather accurately, the thickness of a mail piece based upon the weight. In addition, the controller will determine if the weight of the mail piece is within the postal regulation limits.

Upon obtaining the weight, the mail piece is then conveyed to the postage meter 21 to have postage applied thereto. After this, the mail piece is conveyed from the postage meter 21 to the stacker 22. As a mail piece is being conveyed, the OCR unit 24 reads the zip code on the mail piece and sends the same to the controller 14, where zip code breaks and tray alerts are determined from information obtained from the OCR unit 24 and scale 16 as will be described in more detail in conjunction with FIGS. 2–5. The mail pieces will be stacked by the stacker 22, placed on the conveying means 28 and sent to the traying unit 26 under control of the controller 14. Thereafter, the mail pieces will be placed in trays in accordance with the tray break as determined by the controller 14 and label identifying the contents of the tray will be printed by the tray label printer 30 and applied to the tray. Although the OCR unit 24 is shown as being downstream from the scale 16, it could be located downstream from the postage meter 21 as well.

In reading the zip codes of the mail pieces, when a zip code on a mail piece cannot be read or has a different zip code from those mail pieces adjacent thereto that have the same zip code, the controller 14 upon comparing the zip codes of the prior mail piece and next mail piece will outsort the mail piece. If the zip codes are in sequence, except for the invalid mail piece, the count of mail piece zip codes will continue, and will be added numerically for the purpose of determining zip code qualification. 0f course, the invalid mail piece that is outsorted is not counted as a sequential mail piece with the same zip code. A non-discounted postage will be applied to the outsorted mail piece and mailed separately. If the prior and next mail pieces have different zip codes, there will be a zip code break and no outsorting.

Figure 2:
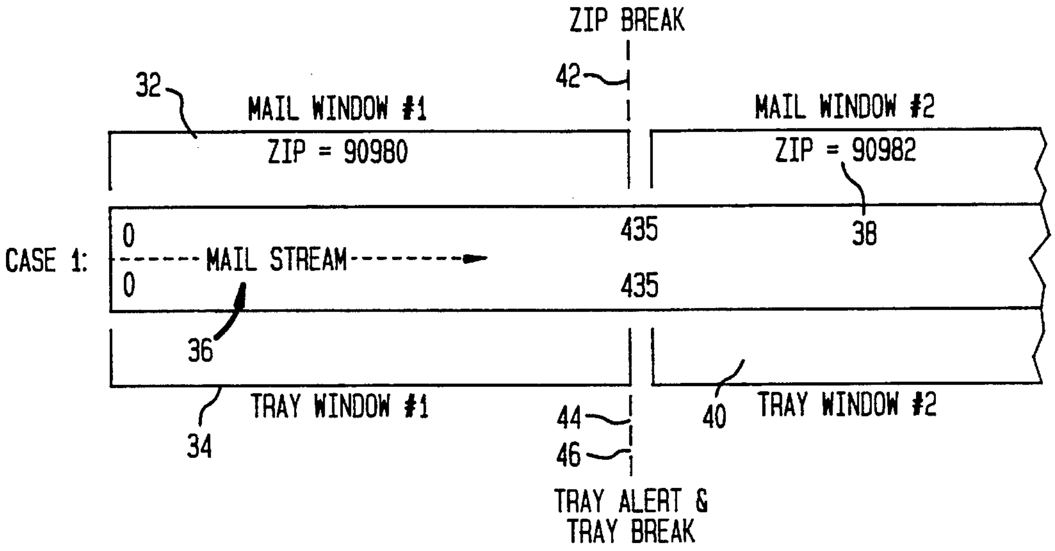
FIGS. 2–5 schematic representations of examples of mail window and tray window operations that can be used in the system of FIG. 1.

With reference now to FIGS. 2–5 a mail window 32 and a tray window 34 are first established in the controller 14. By window is meant an object in the controller 14 memory which contains counts of the zip codes for the mail window or counts of the physical mail pieces for the tray window. As shown in FIGS. 2–5, the first mail window is represented by reference number 32, the first tray window by 34 and the physical mail stream is represented by reference no. 36. In FIG. 2, an example is given of a batch of mail having 435 mail pieces with the same zip code 90980. This number is determined by the controller 14 based on data received from the OCR unit 24. Thereafter, there will be a second mail window 38 and a second tray window 40. It will be appreciated that the controller 14 has sufficient time to determine the number of mail pieces having the same zip code or reading the number for a tray break during the time mail is conveyed from the OCR unit 24 to the stacker 22. The second mail; window 38 is generated to account for mail pieces having the zip code 90982. Because there are 435 mail pieces with a zip code 90980, there is a correlation between the number of zip codes that satisfy the postal requirement for zip code classification, in this case, a five digit zip, and the number of mail pieces that can be received by a tray. Because of this correlation, the zip code break 42, the tray alert 46 and tray break 46 occur at 435 mail pieces. In this case, a single tray which contains all mail pieces with the zip code 90980 will be sent to the post office and receive the full postal discount for a five digit zip. It will be appreciated that the tray break 46 is determined from the thickness calculations of the mail pieces.

Figure 3:
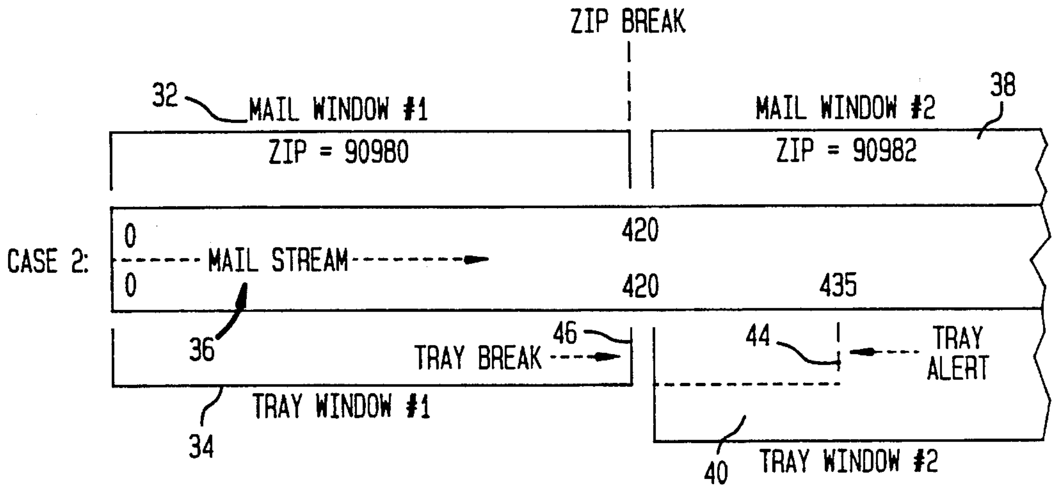

With reference to FIG. 3, once more the mail window 32 is generated for mail pieces having the zip code 90980 and the tray window 36 also will establish a tray alert of 435 mail pieces. It will be recalled that the tray alert is a flag warning that the capacity for a tray is being approached. In this case, however, the number of mail pieces having the zip code, 90980 is 420; whereas, the number of mail pieces that can be accommodated by a tray is greater than 435. As a result of this, one of two actions can be taken by the controller 14. Either the mail tray will be filled partially with mail pieces having the zip code 90980, or the tray can be filled completely, alternatively, with mail pieces having the zip codes 90980 and 90982. Because the first window 32 and second window 38 accommodate mail pieces having the same three digit zips, it may be advantageous to fill the tray completely and obtain the postal discount applied to three digit zips. On the other hand, if the zip code of the mail pieces monitored by the second window 38 are substantially different from the zip code monitored by the mail window 32, then it may be advantageous to the mailer to only have a tray partially filled and receive the discount for the five digit zip on the 420 mail pieces. These determinations are made by the controller 14.

Figure 4:
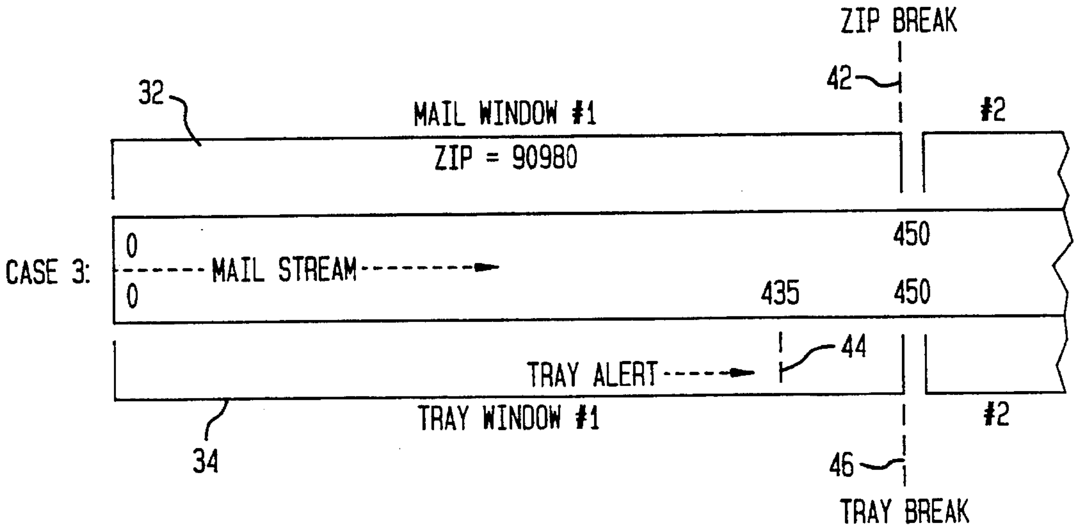

With reference to FIG. 4, another example is given of the operations of the mail window 32 and tray window 34. In this case, it is determined that a tray break 46 occurs after 450 mail pieces. As stated previously, this tray break 46 represents the number of mail pieces that will fill a tray and satisfy the requirements for the postal discount with a tolerance such as 20 mail pieces more or less. The tray window 34 flags a tray alert 44 at 435 mail pieces; however, no zip code break was seen in the last 20 mail pieces. The tray window 32 continues advancing the count until the mail window 32 finds a zip break at count 450 or until 20 more pieces are counted. The tray and mail windows are closed at mail piece count 450 and the second tray and second mail windows begin with mail piece count 451.

Figure 5:
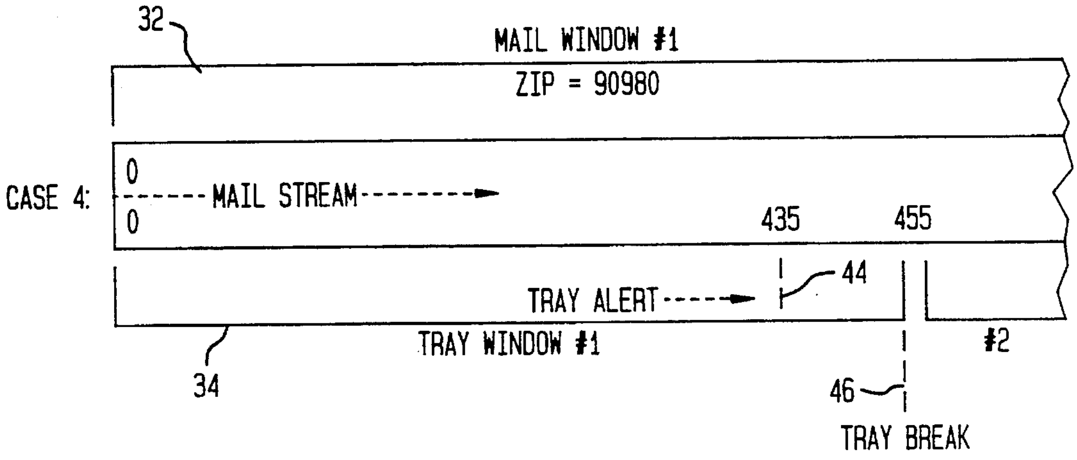

With regard to FIG. 5, the tray window 34 flags a tray alert 44 at the 435 mail piece count; however, no zip break 42 was seen for the last 20 mail pieces. The tray window 34 then continues and waits to see if the mail window 32 finds a zip code break 42 within the next 20 pieces. When it does not, the tray window 34 is closed at mail piece count 455 and the second tray window 40 begins with mail piece count 456, The mail Window 32 will continue until it sees a zip break 42. At this point, a determination will be made as to the number of mail pieces and the zip codes counts.

Figure 6:
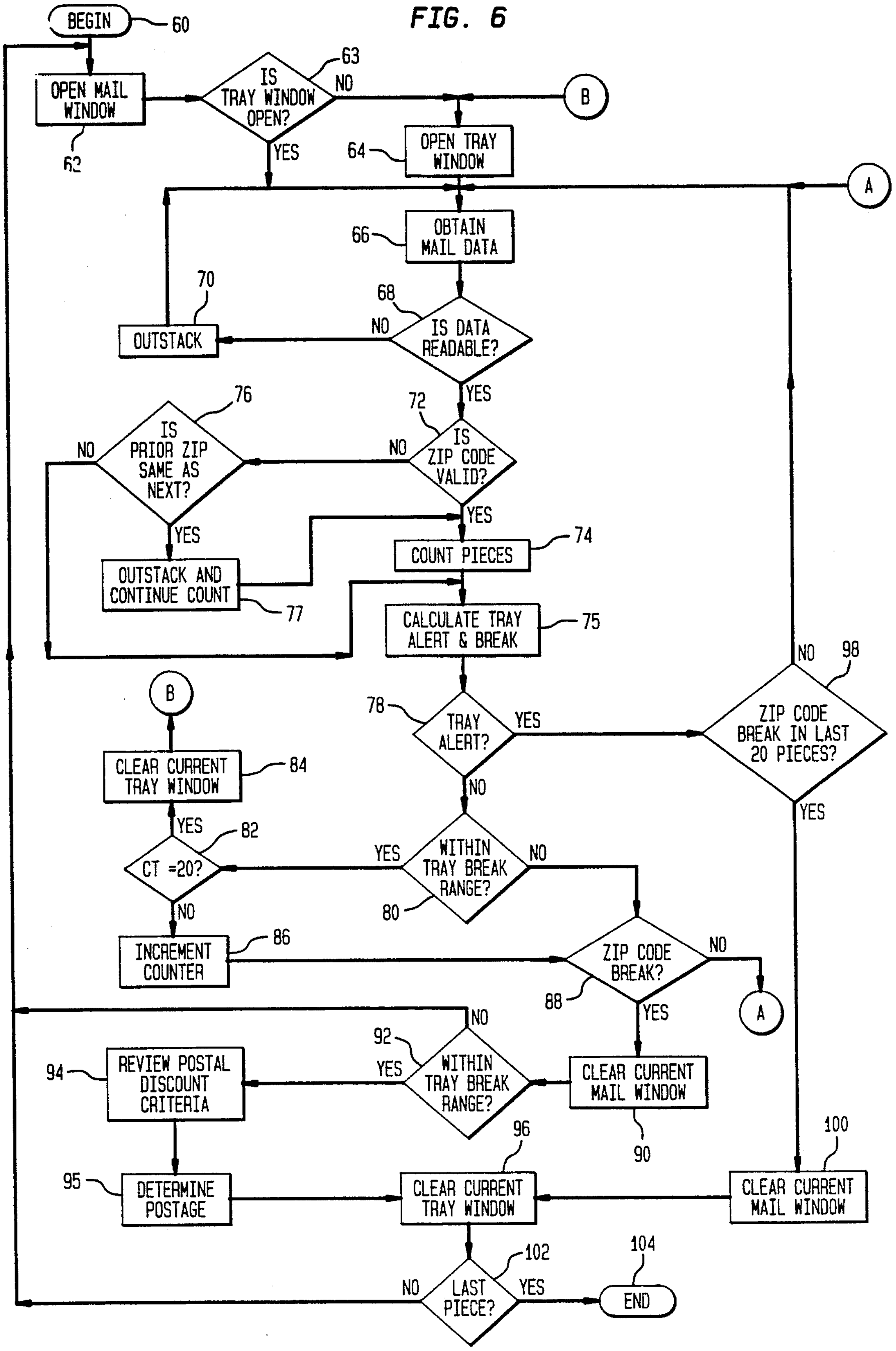
FIG. 6 is a flow chart of the program for the instant invention.

With reference now to FIG. 6, a flow chart is shown that represents the program of the controller 14 for carrying out the instant invention. The process is begun 60 and a mail window is opened 62. A determination is made whether a tray window has been opened 63. If a tray window is not open, then this will be performed 64, but if the tray window is already in existence, there will be a looping from the inquiry 63 relative to the opening of a tray window. Thereafter, the mail data is obtained 66 from each mail piece and the question is first asked whether the zip code data is readable 68. If the data is not readable, the mail piece is outstacked 70 and there is a return to the obtaining of mail data 66. If yes, the question is then asked is the zip code valid 72. This is basically asking the question, whether there has been a change in zip code from one mail piece to the next. If the zip code is not valid, the question is asked whether the zip code of the prior mail piece is the same as the zip code on the subsequent mail piece 76. If so, the mail piece with a different zip code is outstacked and the count continues without interruption or the inclusion of that one piece 77. If the zip code is valid 72, the mail pieces are counted 74 and the tray alert and tray break are calculated 75. The tray break is determined based upon the calculated thicknesses of the mail pieces and the tray alert is an arbitrary number chosen to warn that a tray break is near. If the inquiry 76 as to the prior zip code were negative, there is a looping to calculate the tray alert and tray break 75. The question is asked whether there are enough mail pieces for the purpose of determining a tray alert 78. If not, the question is asked whether the number of mail pieces is within a tray break range 80. It will be recalled that the number of mail pieces that will be able to be placed into a tray are dependent upon a thickness of the mail pieces. A sufficient quantity of mail pieces must be processed before the tray alert can be calculated. If the number of mail pieces is within the tray break range, as for example twenty pieces, the question is asked, is the number of mail pieces within twenty pieces of the tray break 827? If yes, the current tray window is cleared 84 and there is a return to the open tray window command 64. If not, the counter is incremented 86 and the question is then asked, is there a zip code break 88? A zip code break will occur when there is a change in zip code, and the new zip code repeats in subsequent mail pieces. Also, if the answer to the inquiry relative to being within a tray break range 80 is no, the question also is asked whether there is a zip code break 88. If not, there is a return to the obtain mail data command 66. If there is a zip code break, the current mail window is cleared 90 and an inquiry made to whether the number of mail pieces is within the try break range 92. If not, there is a return to the obtain mail data command 66. If it is within the tray break range, the criteria for a postal discount is reviewed 94, the postage for the mail is determined 95 and the current tray window is cleared 96.

If the inquiry as to a tray alert 78 were no, the question is asked has there been a zip code break within the last twenty mail pieces 98. If no there is a return but if yes, the current mail window is cleared 100 and then the current tray window is cleared 96. The question is then asked is whether the last mail piece has been processed 102. If the answer is yes, then the program comes to an end 104, but if the answer is no, there is a return to the point where the mail window is opened 62.

Thus, what has been shown and described is an apparatus and method whereby the maximum amount of postage discount can be obtained by a mailer by fashioning the mail process so as to correlate the mail process to the postage discount criteria of the postal service.

The above embodiments have been given by way of illustration only, and other embodiments of the instant invention will be apparent to those skilled in the art from consideration of the detailed description. Accordingly, limitations on the instant invention are to be found only in the claims.

What is claimed is:

1. In a method of processing a stream of mail pieces which are conveyed in zip code order from a production mail unit to a scale, past a code reading unit and to a mail piece stacker, the steps comprising:

a) opening a mail window for the purpose of obtaining counts of sequential mail pieces having a qualifying zip code or zip codes;

b) determining the thicknesses of the mail pieces;

c) counting the number of sequential mail pieces with qualifying zip code or zip codes and uploading the count to the mail window;

d) establishing a tray break window to indicate a tray break based upon the number and thicknesses of the mail pieces;

e) determining if there is a zip code break by determining a change in zip code from one sequential stream of mail pieces to the next sequential stream of mail pieces;

f) clearing the mail window upon determining the occurrence of a zip code break;

g) determining if there is a sufficient number of sequential mail pieces with qualifying zip code to qualify for the maximum postal discount while the maximum number of mail pieces are placed in the tray; and h) clearing the tray break window upon the number of sequential mail pieces with qualifying zip code or zip codes being sufficient to fill a mail tray based upon the thicknesses of the mail pieces.

2. The method of claim 1 including the further step of clearing the tray break window upon the number of sequential mail pieces with qualifying zip code or zip codes being sufficient to fill a mail tray based upon the thicknesses of the mail pieces.

3. The method of claim 2 further including the steps of weighing each mail piece and determining the postage required for the mail pieces based upon the weight of the mail pieces and the determination of whether the postal discount qualification has been met.

4. The method of claim 2 further including the step of determining if the zip code of a mail piece is readable and outsorting those mail pieces having zip codes that are not readable.

5. The method of claim 2 further including the steps of determining a zip code break in the sequence of mail pieces, comparing the zip code of the prior mail pieces to the zip code of the subsequent mail piece to that with the zip code break, outsorting the mail piece with the different zip code if the zip codes on the prior and subsequent mail pieces are the same and continuing the zip code count for the mail window to include the prior mail pieces and subsequent mail pieces with the same zip code.

6. Apparatus for processing a stream of mail pieces which are conveyed in zip code order from a production mail unit to a scale, past a code reading unit and to a mail piece stacker, comprising:

a) means for opening a mail window for the purpose of obtaining counts of sequential mail pieces having qualifying zip code or zip codes;

b) means for determining the thicknesses of the mail pieces;

c) means for counting the number of sequential mail pieces with zip code or zip codes and uploading the count to the mail window;

d) means for establishing a tray break window to indicate a tray break based upon the number and thicknesses of the mail pieces;

e) means for determining if there is a zip code break by determining a change in zip code from one sequential stream of mail pieces to the next sequential stream of mail pieces;

f) means for clearing the mail window upon determining the occurrence of a zip code break;

g) means for determining if there is a sufficient number of sequential mail pieces with qualifying zip code or zip codes to quality for the maximum postal discount, while the maximum number of mail pieces will be placed in a tray;

h) means for clearing the tray break window; and i) means for clearing the tray break window upon the number of sequential mail pieces with qualifying zip code being sufficient to fill a mail tray based upon the thicknesses of the mail pieces.

7. The apparatus of claim 6 further including means for clearing the tray break window upon the number of sequential mail pieces with qualifying zip code being sufficient to fill a mail tray based upon the thicknesses of the mail pieces.

8. The apparatus of claim 7 further include means for weighing each mail piece and determining the postage required for the mail pieces based upon the weight of the mail pieces and the determination of whether the postal discount qualification has been met.

9. The apparatus of claim 7 further including means for determining if the zip code of a mail piece is readable and means for outsorting those mail pieces having zip codes that are not readable.

10. The apparatus of claim 7 further including means for determining a zip code break in the sequence of mail pieces, means for comparing the zip code of the prior mail pieces to the zip code of the subsequent mail piece to that with the zip code break, means for outsorting the mail piece with the different zip code if the zip codes on the prior and subsequent mail pieces are the same and means for continuing the zip code count for the mail window to include the prior mail pieces and subsequent mail pieces with qualifying zip code.

* * * * *